(12) United States Patent
Willner

(10) Patent No.: US 10,438,219 B2
(45) Date of Patent: Oct. 8, 2019

(54) FROM SENTIMENT TO PARTICIPATION

(71) Applicant: Dual Stream Technology, Inc., Santa Cruz, CA (US)

(72) Inventor: Leopold B. Willner, Santa Cruz, CA (US)

(73) Assignee: DUAL STREAM TECHNOLOGY, INC., Santa Cruz, CA (US)

( * ) Notice: Subject to any disclaimer, the term of this patent is extended or adjusted under 35 U.S.C. 154(b) by 0 days.

(21) Appl. No.: 16/017,740

(22) Filed: Jun. 25, 2018

(65) Prior Publication Data

US 2019/0005522 A1     Jan. 3, 2019

Related U.S. Application Data

(60) Provisional application No. 62/604,314, filed on Jun. 30, 2017.

(51) Int. Cl.
*G06Q 30/02*     (2012.01)

(52) U.S. Cl.
CPC ................ *G06Q 30/0204* (2013.01)

(58) Field of Classification Search
CPC ........ G06Q 30/0204; G06Q 30/0203
USPC ....................................... 705/7.33
See application file for complete search history.

(56) References Cited

U.S. PATENT DOCUMENTS

| | | |
|---|---|---|
| 7,082,422 B1 | 7/2006 | Zirngibl et al. |
| 7,107,218 B1 | 9/2006 | Preston |
| 8,380,486 B2 * | 2/2013 | Soricut ............... G06F 17/289 704/2 |
| 8,676,563 B2 * | 3/2014 | Soricut ............... G06F 17/289 704/2 |
| 9,245,232 B1 * | 1/2016 | Trautmann ........ G06F 17/30902 |
| 9,465,833 B2 | 10/2016 | Aravamudan et al. |
| 2009/0006268 A1 | 1/2009 | Tanner |

(Continued)

FOREIGN PATENT DOCUMENTS

WO   WO 2018/208988   11/2018

OTHER PUBLICATIONS

PCT Application No. PCT/US2018/031899 International Search Report and Written Opinion dated Jul. 23, 2018.

(Continued)

*Primary Examiner* — Dylan C White
(74) *Attorney, Agent, or Firm* — Polsinelli LLP

(57) ABSTRACT

Methods and systems consistent with the present disclosure identify useful ways/means of maximizing levels of participation from a target audience based on identifying a strong positive sentiment toward real-world decisions performed by members of a group of persons. Members of a particular group of persons may be considered a human swarm or a skilled human swarm that provide information relating to factors that prevent group members from making a commitment. Members of a human swarm may have been selected based on a series of tests that identify skilled persons. Once a particular sentiment is identified, that sentiment may be broadened or extended by combining information or by identifying differences (contrasts) between factors, answers, assessments, or forecasts provided by humans as compared to a machine intelligence, via an iterative process that statistically raises a level of participation with members that have strong sentiments regarding a class of products or services.

21 Claims, 8 Drawing Sheets

(56) References Cited

U.S. PATENT DOCUMENTS

| | | | | |
|---|---|---|---|---|
| 2012/0084238 A1* | 4/2012 | Kristal | ............... | G06Q 10/04 706/12 |
| 2012/0290910 A1* | 11/2012 | Kumar | ............... | G06F 16/972 715/205 |
| 2015/0277730 A1* | 10/2015 | Rosenberg | ............ | E21B 47/18 715/753 |
| 2016/0057182 A1* | 2/2016 | Rosenberg | ........... | H04L 65/403 715/753 |
| 2017/0300198 A1* | 10/2017 | Rosenberg | ............ | G06F 3/011 |
| 2017/0309193 A1* | 10/2017 | Joseph | ................ | G06N 7/005 |
| 2018/0012166 A1* | 1/2018 | Devadas | ......... | G06Q 10/06315 |
| 2018/0053114 A1* | 2/2018 | Adjaoute | ......... | G06N 99/005 |
| 2018/0197066 A1* | 7/2018 | Osotio | ................ | G06N 3/004 |
| 2018/0330240 A1* | 11/2018 | Willner | ............... | G06N 5/02 |
| 2019/0073602 A1 | 3/2019 | Willner | | |

OTHER PUBLICATIONS

Bragg et al., "Optimal Testing for Crowd Workers"—2016—http://aiweb.cs.washington.edu/ai/pubs/bragg-aamas16.pdf (Year: 2016).
U.S. Appl. No. 15/975,050 Office Action dated Apr. 1, 2019.

\* cited by examiner

FROM SENTIMENT TO PARTICIPATION

CROSS REFERENCE TO RELATED APPLICATIONS

The present invention claims priority benefit of U.S. provisional application No. 62/604,314 filed on Jun. 30, 2017 entitled "From Sentiment to Participation" the disclosure of which is incorporated by reference.

BACKGROUND OF THE INVENTION

Field of the Invention

The present invention is generally directed to methods and apparatus associated with intelligent systems. More specifically, the present invention is directed to computerized methods and systems that use contrasting information when identifying factors that are more likely to persuade members of a class of individuals.

Description of the Related Art

Methods for collecting information regarding to and that identify factors that are more likely to persuade individual persons to make a commitment suffer from limitations that include high cost, excessive uncertainty, or lack of focus on a targeted population. Advertising companies often rely on focus groups when those advertising companies are interested in selling a product. Members of such focus groups are commonly selected through expensive processes that only identify a small number of individuals that meet a criterion. For example, if Mercedes Benz were to sponsor a focus group, members of that focus group could be selected by various different criterion that may includes: individuals that had previously purchased a vehicle made by Mercedes Benz, individuals that have greater than a certain threshold household annual income, individuals that like classy cars, individuals that like sporty cars, or individuals that have recently received a higher credit rating. Once identified, potential members of a focus group are approached and are requested to attend a focus group meeting, after which cooperative focus group members may attend a focus group where their opinions regarding a new Mercedes Benz vehicle may be solicited. The process of setting up and administrating a focus group can cost tens of thousands of dollars to assess the opinions of a small number of people, sometimes as few as 10. Since traditional focus groups commonly rely on a small number of participants from a demographic, information derived from these focus groups may not be statistically significant. For example, when a particular demographic in the United States for purchasing a late model Mercedes Benz includes as few as 10,000 individuals, a focus group including 10 people will not be statistically significant and may likely not yield accurate results. As such, when companies perform focus groups using few people, those companies may likely be spending tens of thousands of dollars collecting worthless information. As such, traditional focus groups suffer from the limitation of spending too much to generate statistically significant results or from the limitation of spending less at the risk of collecting worthless information.

Another method commonly used to collect information regarding to and that identify factors that are more likely to persuade individual persons to make a commitment are surveys. Surveys are often provided to large numbers of individuals that are frequently selected been selected using very general guidelines or criterion. Based on this, individuals requested to participate in a survey may not truly meet a criterion used to select members of a focus group, even though the focus group and the survey may be associated with a same or similar subject (selling a late model Mercedes Benz, for example). Since surveys consist of questions and corresponding answers, without additional dialogue between the survey members and a survey provider, surveys cannot collect information that was not previously identified as relevant by the survey provider. As such surveys suffer from limitations relating to accuracy, when members of the survey group have not been well vetted, or can suffer from limitations relating to not being able to collect information that was not already included in a set of survey questions.

Historically, ever since the dawn of humanity, the human species has benefited from the ability of applying the human mind to solving problems that affect humanity. Because of various factors that include human reason, the ability that humanity has to develop tools and the ability to pass knowledge from generation to generation, the human species has become the most powerful species on planet Earth. The human species has also domesticated various other species, such as horses, dogs, and elephants and has used these other species in symbiotic relationships.

Recently, the human species has begun to create new forms of intelligence in the form of intelligent machines. Commonly referred to as artificial intelligence (AI), intelligent machines come in forms that include computer modeling software, stochastic engines, neural networks, and fuzzy logic. These intelligent machines operate in fundamentally different ways than do the minds of organic species like humans because humans are part logical and part emotional in nature, where AI machines are more computational and are devoid of emotion. This means that people that are members of the human species and AI machines are members of the machine species are alien to each other.

In recent years, AI has been harnessed to perform speech recognition, identify individuals using biometric information (such as fingerprints and retinal scans), play games like chess, and to perform tasks like facial recognition. In these applications, machine intelligence often outperforms humans because the problems associated with interpreting speech, identifying biometric markers, and playing games have a limited or fixed set of rules and because modern computers can perform calculations directed to a limited or fixed set of rules much faster than humans can.

As such, in some applications, machine intelligence is able to perform tasks with a greater degree of accuracy, proficiency, or speed then can be performed by a member of the human species. In yet other instances, human intelligence can perform tasks or make evaluations better than machines can. For example, humans are better than machines at interpreting body language or emotional quest associated with other humans. Humans are also better at performing tasks where an equation cannot be applied to solve a problem that has an emotional component or that has a context that a machine cannot understand.

AI has also been used to identify trends using collected data. In certain instances, this data may be related to a demographic of humans. For example, the chances of a white male to vote Republican or Democratic may be related to age, yet may also be related to zip code, profession, or other pieces of demographic information. Similarly, the propensity for a female to purchase a Mercedes Benz may relate to age, yet may also be related to zip code, profession, income, or other pieces of demographic information. Because of this, AI systems may suffer from various limitations, for example demographic filters that may include a set of pre-anticipated criteria (age or income, for example) may not include other factors that are not included in the set of pre-anticipated criteria. This indicates that AI systems will likely at some point in time provide information or forecasts that are incorrect because the AI system is constrained to operate with only the set of pre-anticipated criteria when making assessments and forecasts regarding human consumption.

Another limitation in AI systems relates to the fact that an AI system has no way of checking or testing that information received from individuals of a group is accurate. In instances where an AI systems retrieves or is provided inaccurate information regarding individuals in a group, any assessments or forecasts provided by that AI system regarding that group may likely be flawed.

Fundamentally AI systems are also limited because they cannot collect additional information directly from members of a demographic or group of individuals.

Humans interpret the world in a different way than machines. In fact contextual information that humans use naturally are alien to machines. In a given situation, humans naturally identify contextual information implied by basic implicit assumptions that humans take for granted. For example, a wife may see her husband carrying a bag of groceries into the house: Did you buy me beer? For humans, the making the contextual association of a trip to the grocery store with the purchase of a commodity, such as beer, is natural. A machine observing the husband carrying a grocery bag, would not have a contextual reference that that bag really contained a consumable, nonetheless a consumable that could provide enjoyment when consumed.

Some of the differences between humans and machines is that humans can be emotionally driven where machines are not. For example, humans have been known to react emotionally and sell a stock because of a fear. Such fear based selling may then cause other inventors to also sell their stocks based on that fear. As such, un-tethered human emotions can and have caused panic selling based on an emotional apprehension. In contrast, machines incapable of panicking stock markets based on emotional fears or apprehensions. In another example male members of a combat group may behave irrationally and try to protect female soldiers in ways that are risky or foolish, where machines would not deviate from a course of action based on the gender of certain soldiers.

Each particular species of intelligence has biases and limitations. Many of these limitations relate to the fact that sensory systems associated with a particular form of intelligence do not have the capability of perceiving reality 100% accurately. Reality may also be difficult to interpret when a particular problem arises. This is especially true when that particular problem is complex and is not bounded by a limited or fixed set of rules. As such, when a problem has sufficiently complex and has uncertain rules or factors, one particular intelligence may be able to solve that problem at a given moment better than another form of intelligence. Humans can often quickly grasp a dangerous situation in a factory or mine from information interpreted in a context when machines are much less likely to identify that dangerous situation. This may be because machines may not be aware of contextual information that humans take for granted.

Another issue confronting humanity today is a rush to embrace technologies that are immature, that have a high level of complexity, and that are not bounded by a fixed set of rules. For example, there is a rush to user in the use of autonomous vehicles after only a few years of development and stock market traders are more and more reliant upon computer models that drive the buying and selling of stocks. One minor error or one minor miss-interpretation of contextual information can lead an AI system to cause a fatal vehicular crash or to drive the economy into a recession/depression via a stock market crash. Because of this, an overreliance on any one form of intelligence may cause actions to be initiated that have negative consequences, when an incorrect answer leads to inappropriate actions, the consequences could be very significant. As such, an over-reliance on a particular type of intelligent species may lead to an incorrect answer as compared to systems and methods that review contrasting answers from different forms of intelligence to answer a question.

Based on the foregoing background information, AI or machine intelligence directed to forecasting how to increase sales of a particular product or service will likely be unreliable at least more frequently than systems and methods that that use both human and machine intelligence.

What are needed are systems and methods that identify answers that are more likely to result in a preferred outcome when complex problems that include sufficient uncertainty are being solved (where uncertainty here does not simply mean unknown, but, instead, is the uncertainty of results from real world situations out of stochastic processes whose probability distributions are themselves in flux or changing, or out of the game playing of intelligent actors). What are needed are also systems and methods that combine human and machine intelligence in new ways or that identify instances when human intelligence and machine intelligence make contrasting forecasts or decisions.

SUMMARY OF THE PRESENTLY CLAIMED INVENTION

Methods, non-transitory computer readable medium, and apparatus consistent with the present disclosure relate to identifying factors that mitigate objections to making a commitment by members of a group. A method consistent with the present disclosure may include steps of receiving selections from a plurality of user devices, receiving information from an intelligent machine process, and identifying a factor that mitigates the effect of an obstacle that could prevent a statistically significant number of users from a first user group from committing to an offering. The presently claimed method may also include identifying user sentiments upon which a statistical analysis is performed, sending probes to the user devices, receiving probe responses, evaluating the probe responses, where the mitigating factor may be identified based on the evaluation of the probe responses.

When the method of the presently claimed invention is performed by a processor executing instructions out of a memory, that method may also include receiving selections from a plurality of user devices, receiving information from an intelligent machine process, and identifying a factor that mitigates the effect of an obstacle that could prevent a statistically significant number of users from a first user group from committing to an offering. The presently claimed method when implemented by the processor executing instructions out of the memory may also include identifying user sentiments upon which a statistical analysis is performed, sending probes to the user devices, receiving probe responses, evaluating the probe responses, where the mitigating factor may be identified based on the evaluation of the probe responses.

Apparatus consistent with the presently claimed invention may include a network interface that receives selections from a plurality of user devices and that receives information from an intelligent machine process. This apparatus may also include a memory and a processor that executes instructions out of the memory when identifying a factor that mitigates the effect of an obstacle that could prevent a statistically significant number of users from a first user group from committing to an offering. The processor executing instructions out of the memory may also identify user sentiments upon which a statistical analysis is performed, after which the network interface may send probes to the user devices and receive probe responses for evaluation by the processor. The evaluation performed by the processor may identify a factor the mitigating factor may be identified based on the evaluation of the probe responses.

DETAILED DESCRIPTION

Figure 1:
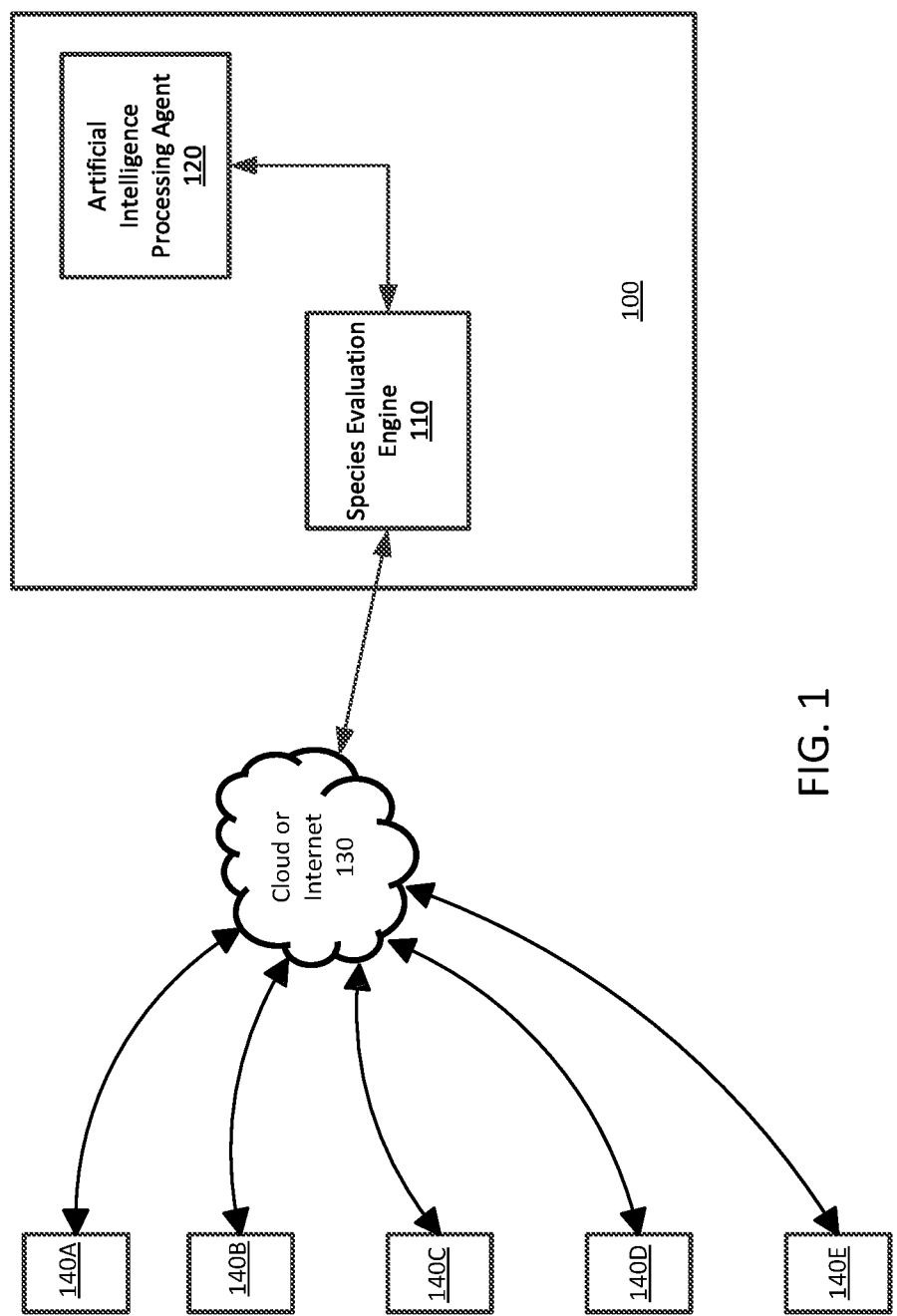
FIG. 1 illustrates a computing device that receives answers from different user devices and from an artificial intelligence processing agent.

Methods and systems consistent with the present disclosure identify useful ways or means of maximizing levels of participation from a target audience based on identifying a strong positive sentiment toward real-world decisions performed by members of a group of persons. Members of a particular group of persons may be considered a human swarm or a skilled human swarm that provide information relating to factors that prevent group members from making a commitment. Members of a human swarm may have been selected based on a series of tests that identify skilled persons. Once a particular sentiment is identified, that sentiment may be broadened or extended by combining information or by identifying differences (contrasts) between factors, answers, assessments, or forecasts provided by humans as compared to a machine intelligence, via an iterative process that statistically raises a level of participation with members that have strong sentiments regarding a class of products or services.

Methods and systems consistent with the present disclosure may identify obstacles that prevent particular members of a group or human swarm from making a commitment. Furthermore, such methods and systems may identify things or factors that overcome an obstacle preventing a group member from making a commitment. These obstacles and ways to overcome them may be identified via feedback provided by individuals of the particular human swarm or these obstacles may be identified by combining and/or contrasting factors or answers associated with human cognition with factors evaluated by or with answers provided by the machine intelligence.

If a positive sentiment were enough for an advertiser of a product or service to convince a target audience to move forward and commit to purchasing particular products or services, humans would all be grasping for every appealing thing in sight, as children do. Instead humans, especially human adults do not commit to purchase products or services just because they like those products or services, perhaps this is because of a factor that Sigmund Freund called the "superego" that prevents humans from doing committing to anything based on a favorable sentiment alone. Whether or not the so called "superego" of Dr. Freund is really the operator that prevents humans from making a commitment, humans often do hesitate before they make a commitment. As such, people do not come home with every attractive jacket, laptop or automobile in sight, money notwithstanding based on some human trait, bias, concern, reluctance, preference, or other factor.

The particular disclosure may include identifying what is both necessary and sufficient for a statistically significant number of members of a tested group (human swarm) of individuals to commit to a purchase of a product or service. This process may begin with identifying users that have a consistent sentiment or feeling, include testing the identified users, and may add only those users that pass certain tests to a particular human swarm. The process may identify what features or options associated with a product or service that are important enough to cause a statistically significant portion of a human swarm to make a commitment. For example, a person used to buying cars that include seats with an adjustable lumbar support may not purchase a particular car solely based on that car not including a seat with an adjustable lumbar support.

The present disclosure also relates to a human-in-the-loop approach and method/system that overcomes the natural reluctance we all have to moving forward with something new or different. These methods and systems may combine man/human intelligence and machine intelligence to seek out useful ways to overcome such resistance and/or to help energize someone make a commitment regarding something new based on a real interest or benefit associated with members of a group. These methods/systems go far beyond simple cost benefit analysis as these methods/systems may include emotional, atavistic (ancient or ancestral) conditioning or bias, and humanistic aspects of actual human behavior that can or should be taken into account in order to forecast statistically relevant projections based on real world constraints, preferences, or feelings.

The methods of this disclosure may include the steps of 1) combining human cognitions out of a crowd on its sentiments toward a situation, in contrast with the perhaps a more rational point of view of an automaton, and 2) using the results of (1) to facilitate the process of uncovering any obstacles, also known as objections, in the way of participating with and profiting from the same, and 3) energizing the way forward to action as a result of such a method.

The present disclosure also encompasses new ways of combining and employing a variety of measures of sentiment that can be applied to a human population. This may then be combined with what is similarly derived from computational forms of artificial or machine intelligence.

This approach may be taken to reveal any valid objections that may exist against accepting and participating with a product, service, event, or circumstance. The methods employed in this disclosure are designed to facilitate and encourage parties to participate once their objections are identified and overcome. Such methods may identify valid answers, provide offerings that overcome personal bias, or may identify offers conditions or guarantees that are appealing to group members.

Contrasts between information received from a form of machine intelligence or AI may and information received from members of a trained human swarm may be identified. In such instances, these contrasts may be identified based on an objective to identify impediments to members of a demographic to make a commitment or to participate in a given activity. This may be accomplished by filtering a swarm population for individuals who register high on positive sentiments toward a target subject, where members of that swarm population may provide information that identifies bias, preferences, concerns, objections, or other factors associated with that swarm. Once objections are revealed, algorithms or other means may be used to identify how those objections can be overcome. In certain instances, may be overcome based on information relating to the biases, preferences, concerns, or other factors associated with the swarm. The ultimate goal of such methods and systems may be to encourage or realize greater participation.

FIG. 1 illustrates a computing device that receives answers from different user devices and from an artificial intelligence processing agent. FIG. 1 includes species evaluation engine 110 that is communicatively coupled to a plurality of user devices (140A, 140B, 140C, 140D, and 140E) and from artificial intelligence processing agent 120. Each of the plurality of computing devices (140A-140E) are depicted as communicating with species evaluation engine 110 via the cloud or Internet 130. Each of computing devices 140A-140E may include processors that execute program code that may be associated with a web application, with a web browser, or with a downloadable application program.

Communications received by the species evaluation engine 110 may include information or answers to questions. For example, user device 140A may receive an answer to a question from a person using user device 140A and that answer may be transmitted over the cloud or Internet 130 to the species evaluation engine 110. Since people are members of the human species, the person using user device 140A can be considered a member of the human species. Similarly, persons using user devices 140B, 140C, 140D, and 140E may also be considered as members of the human species. The received information or answers may be used to identify a sentiment associated with one or more users of computing devices 140A-140E.

Information received from computing devices 140A-140E may include elections selected by users of devices 140A-140E, these elections may select options to play a game or that are associated with a subject. Such user selections or elections may be used to identify that particular users are engaged in a particular game or subject from which user sentiments may be identified. Alternatively or additionally, sentiments may be identified from answers to questions answered by users or may be identified based on topics or concerns provided by users.

Species evaluation engine 110 may also receive information or an answer to a question from artificial intelligence processing agent 120. Artificial intelligence agent 120 is a form of intelligence that is not human, instead artificial intelligence agent 120 may be associated with a machine species of intelligence.

Note that FIG. 1 includes species evaluation engine 110 and artificial intelligence processing agent 120 within box 100. This indicates that processes performed by species evaluation engine 110 and processes performed by artificial intelligence processing agent 120 may be contained with a single machine device or computer 100. In such instances, one or more processors at machine device 100 may execute program code out of one or more memories when performing functions associated with species evaluation engine 110 or with artificial intelligence processing agent 120.

Alternatively species evaluation engine 110 and artificial processing agent 120 may be different devices that communicate with each other. In certain instances artificial processing agents may be implemented within more than one machine device including the device that performs functions consistent with species evaluation engine 110.

Figure 2:
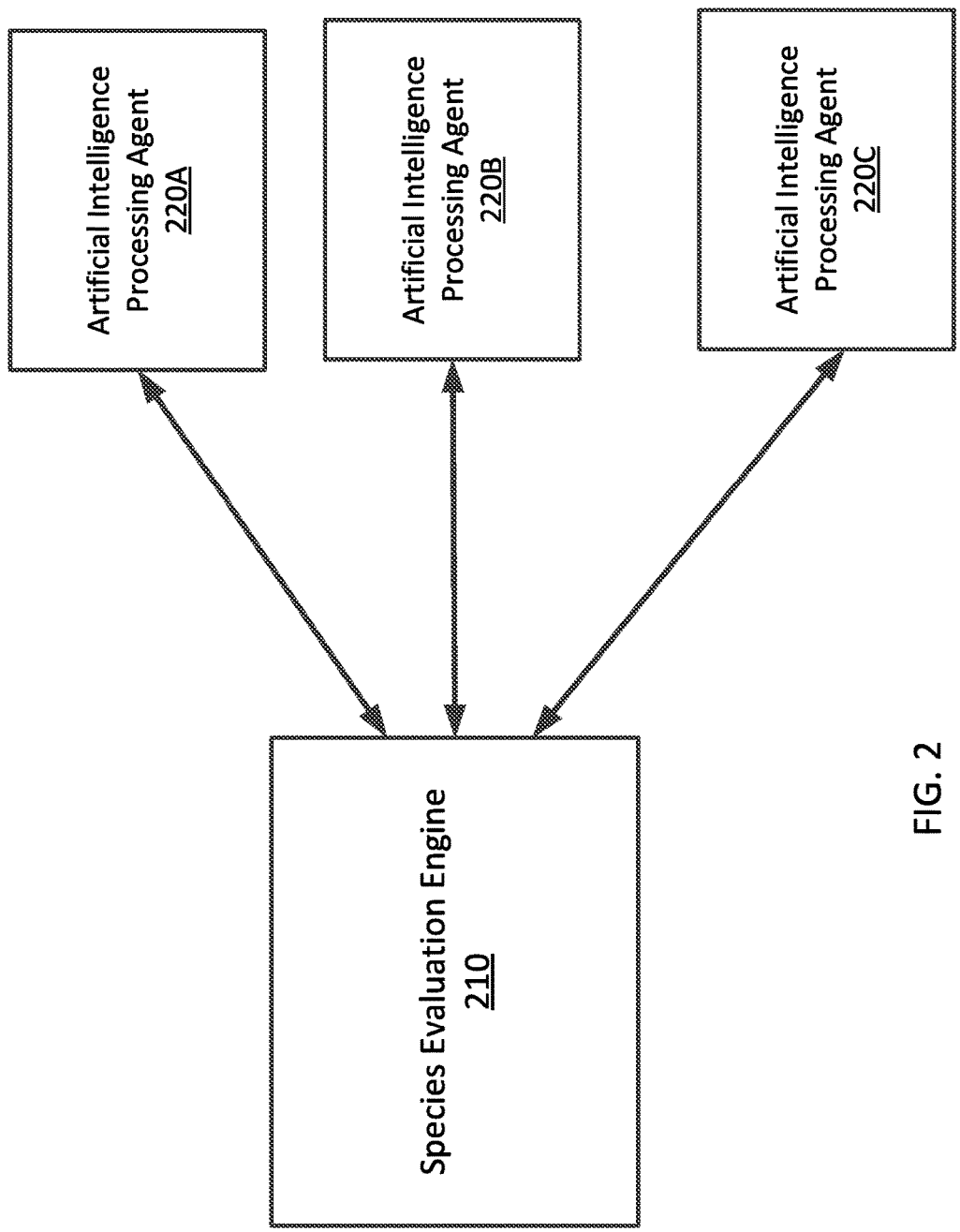
FIG. 2 illustrates a computing device that receives answers from different artificial intelligence processing agents.

FIG. 2 illustrates a computing device that receives answers or information from different artificial intelligence processing agents. Note that species evaluation engine 210 may communicate with numerous different artificial intelligence processing agents 220A, 220B, and 220C of a machine species.

One or more of the artificial intelligence processing agents 220A, 220B, and 220C may be included within a single machine device with species evaluation engine 210. Additionally or alternatively one or more of the artificial intelligence processing agents 220A, 220B, and 220C may be included in one or more machines that are physically distinct from species evaluation engine 210.

Figure 3:
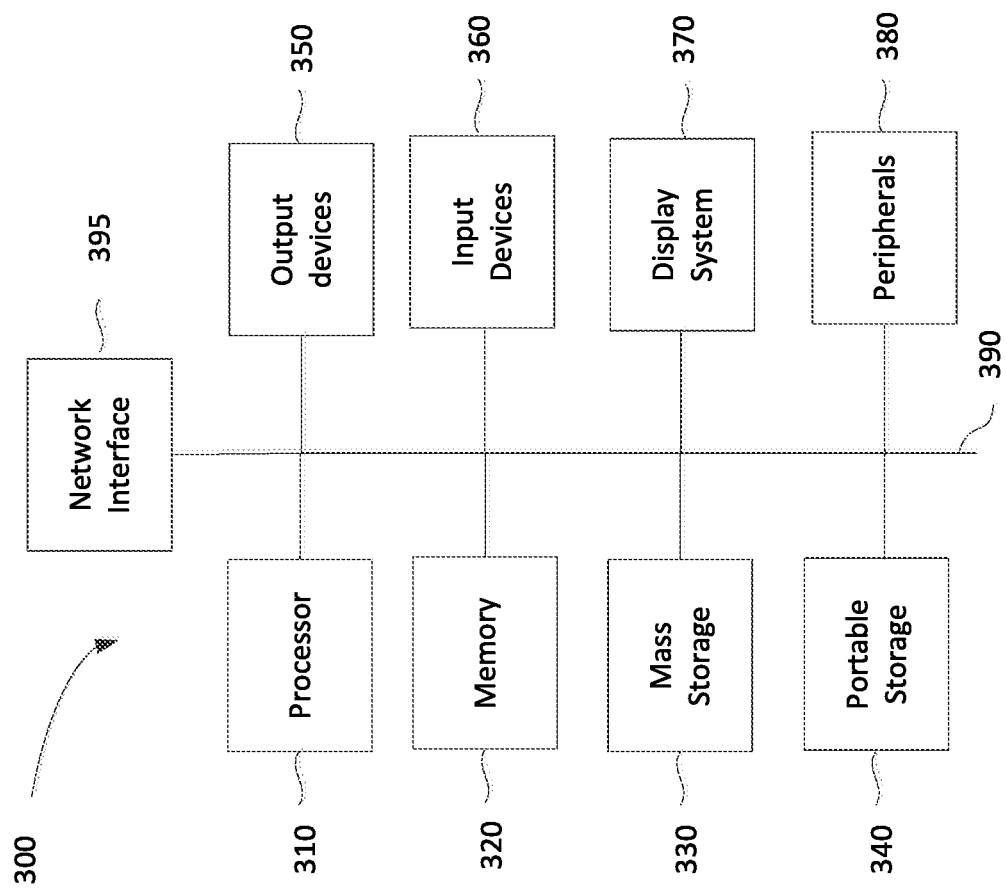
FIG. 3 illustrates an exemplary computing system that may be used to implement all or a portion of a device for use with the present technology.

FIG. 3 illustrates an exemplary computing system that may be used to implement all or a portion of a device for use with the present technology. The computing system 300 of FIG. 3 includes one or more processors 310 and memory 320. Main memory 320 stores, in part, instructions and data for execution by processor 310.

Main memory 320 can store the executable code when in operation. The system 300 of FIG. 3 further includes a mass storage device 330, portable storage medium drive(s) 340, a GPS system 345, output devices 350, user input devices 360, a graphics display 370, peripheral devices 380, and a wireless communication system 385. The components shown in FIG. 3 are depicted as being connected via a single bus 390. However, the components may be connected through one or more data transport means. For example, processor unit 310 and main memory 320 may be connected via a local microprocessor bus, and the mass storage device 330, peripheral device(s) 380, portable storage device 340, and display system 370 may be connected via one or more input/output (I/O) buses. Mass storage device 330, which may be implemented with a magnetic disk drive, solid state drives, an optical disk drive or other devices, may be a non-volatile storage device for storing data and instructions for use by processor unit 310. Mass storage device 330 can store the system software for implementing embodiments of the present invention for purposes of loading that software into main memory 320.

Figure 4:
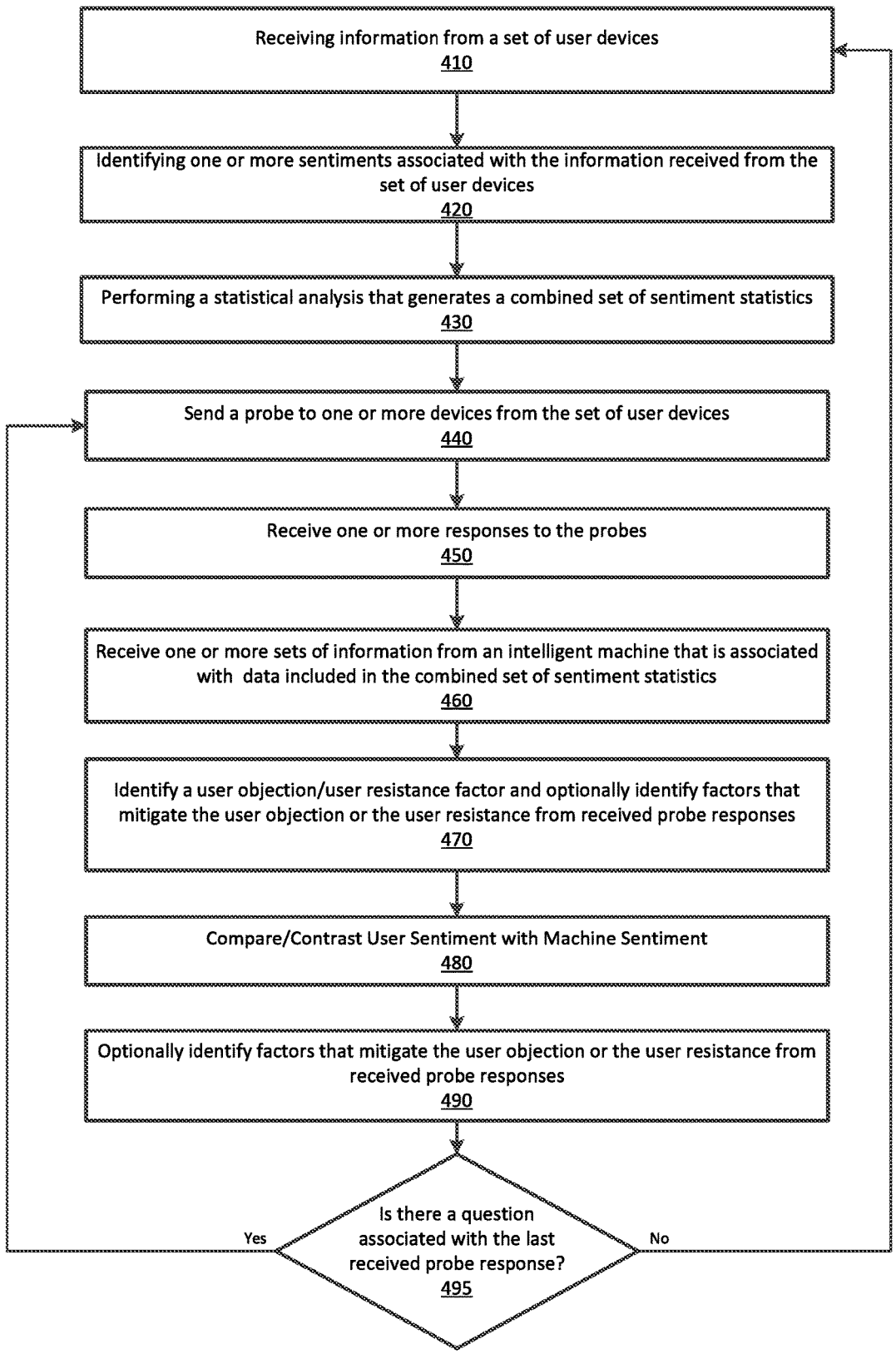
FIG. 4 illustrates an exemplary set of steps that may be performed by server implementing methods consistent with the present disclosure.

Portable storage device 340 operates in conjunction with a portable non-volatile storage medium, such as a FLASH thumb drive, compact disk or Digital video disc, to input and output data and code to and from the computer system 300 of FIG. 4. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a modem or a router.

GPS system 345 may include an antenna (not illustrated in FIG. 3) that receives global positioning information from one or more satellites such that a location associated with a current location of computer system 300 may be identified and provided to processor 310 via bus 390.

FIG. 3 also includes a wireless communication system 385 that may include an antenna (not illustrated in FIG. 3). Wireless communication system 385 may be configured to receive or transmit information via any standard wireless communication technology standard in the art. As such, wireless communication system 385 may receive or transmit information according to a wireless (2G, 3G, 4G, blue-tooth, 802.11, light strobes, or other) cellular or device to device standard, or may use radio or optical communication technologies. Wireless communication system may be configured to receive signals directly from pieces of infrastructure along a roadway (such as a signal light or roadway sensors), may be configured to receive signals associated with an emergency band, or may be configured to receive beacons that may be located at a service or emergency vehicle. Computer systems of the present disclosure may also include multiple wireless communication systems like communication system 385.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

FIG. 4 illustrates an exemplary set of steps that may be performed by server implementing methods consistent with the present disclosure. Step 410 of FIG. 4 is a step where information may be received from a set of user devices. The information received in step 410 may be associated with a subject, an activity, a game, or other stimulus. For example, a selection relating to sporty cars may be received from devices in a set of user devices. Users of such a set of user devices may have been classified or partitioned into a particular user group and information that those users provide via their devices may be associated with a human species stream of information regarding sporty cars, for example. The information received in step 410 may include numerous play options that can be reviewed to identify that a user of a user device is engaged with a subject. The more intently a user responds to information displayed on a graphical user interface (GUI), for example, may be associated with a greater level of user engagement and interest in a subject. As such, sentiment may be obtained from players, they elect to play and may be offered up various play options, which, when engaged, display one or more GUIs upon which the player may act to impart his or her sentiment on the subject included in or associated with those GUIs. User sentiment may be identified by analyzing information that goes beyond just what user selections are made, as users could provide information by speaking words, making utterances, by typing text, or by writing on a user interface. Words or phrases identified in speech, utterances, texts, or in handwriting may be used to identify sentiment. For example, sentiment could be identified regarding an option associated with a desk and positive sentiments may be associated with written, spoken, or selected words or phrases, such as: wow; great; fantastic; or I'd buy that. Negative sentiments could be associated written, spoken, or selected words of phrases, such as: no; get-outa-here; too expensive; or yuck, for example.

Next in step 420 of FIG. 4 one or more sentiments relating to a subject may be identified. For example, a sentiment that a user likes sporty cars may be identified based on numerous interactions received from a device or may be identified based on one or more initial user selections or words collected in step 410 of FIG. 4.

In certain instances user sentiments may be derived by capturing images of user reactions as they are provided media, for example. Here again an assessment regarding whether a user is engaged in a subject or in a set of media presently being provided, whether that media be audio, visual, interactive, or combination thereof can be used to identify user sentiment.

User sentiment in response to actions or media provided to a user may be used to filter or to classify users into a group or to collect statistics relating to sentiment. Step 430 of FIG. 4 is a step where a statistical analysis may be performed using sentiment information or statistics collected in step 420. This analysis may generate a combined set of sentiment statistics, for example.

In another example, a video may be played regarding a new vehicle and user's watching that video may be able to provide responses as that video plays. As such, user responses of different sorts may be collected in step 410, where sentiments are identified in step 420, and analysis is performed in step 430. The analysis performed in step 430 may generate a set of probes or questions to send to user devices based on the data, sentiments and analysis. The probe requests could include additional media or could include textual or visual questions where answers could be provided by one or more means: selection, speaking, writing, or other. In certain instances, subsequent questions could be consistent with a theme associated with a preceding question. Alternatively, subsequent questions could contrast with the theme associated with a preceding question.

The probes are then sent to user devices in step 440 of FIG. 4. These probes could be tailored to specific individuals or to individuals of a group. For example, questions relating to features such as engine displacement, braking distance, braking surface, tire size, the presence or absence of a turbo, the presence or absence of a super charger, and the presence or absence of four wheel independent suspension could be sent to individuals that like sporty cars that also have a statistical correlation to a performance driver. After the probes are sent, responses to those probes may be received in step 450 of FIG. 4.

Next in step 460 of FIG. 4 information may be received from an intelligent machine that may have identified preferred combinations of technical features that may relate to sentiments in the probes or questions sent to the user devices in step 440.

After step 460, step 470 may identify user objections (or resistance factors) from the user responses. Step 470 may also identify factors that may help mitigate the user objection/resistance factor using the received responses. Additional probe requests (not illustrated in FIG. 4) may be sent to user devices when identifying user objection or resistance mitigating factors. The process of FIG. 4 may have identified that users in the sporty car group, may like the performance of a turbocharger, yet do not want to purchase one as an option. Such users may then be provided with probes that identify that these users statistically prefer superchargers and are willing to pay more for them. Additional inquiries may also identify that these users, while liking the performance attributes of a turbocharger, yet have a sentiment that turbochargers are more likely to breakdown or have higher maintenance costs than superchargers. Such analysis may also identify that 40% of sporty car drivers prefer a larger displacement engine over a turbocharger or a supercharger, that 35% of the drivers preferred a supercharger, and that 25% preferred a turbocharger. This analysis may also have identified that 70% of the sporty car drivers that preferred the larger displacement engine would pay a premium over other option packages, where the additional 30% of the drivers that preferred the larger displacement engine, objected to the premium price required to purchase it.

Next in step 480 user sentiments may be compared and contrasted with machine sentiments. Here again additional probes may be sent to users to help in a process that identified factors that mitigate user objections or resistance factors. The machine intelligence sentiments received in step 460 when compared against the user (human) sentiment in step 480 may identify that the machine intelligence forecasted that 35% of sporty car drivers should prefer the lager displacement engine, that 28% of those drivers should prefer a supercharger, and that 37% of those drivers should prefer the turbocharger. Note that the user sentiment and the machine intelligence based sentiment in the example above contrast with each other: larger displacement user/machine 40%/35%: supercharger user/machine 35%/28%: and turbocharger user/machine 25%/37%. Step 490 of FIG. 4 may identify this discrepancy and program flow may move back to step 440 where additional probe requests may be sent to the user devices after which additional mitigating factors or reasons associated with user sentiment may be identified that may account for the discrepancy.

Note in certain instances differences between 40% and 30% user/machine results may be considered not statistically significant, yet the differences between the 35% and 28% or between the 25% and 37% differences above may be considered statistically significant. As such an identification of a statistically significant percentage difference may be associated with a difference of greater than 5%. Since 35%–28%=7%; and since 37%–25%=12% are both greater than a threshold of 5%, these differences may be considered statistically significant.

Additional probe requests and user answers may be able to further clarify user objections and factors that mitigate those objections. As such, the determination that many of those individuals that preferred superchargers would purchase a turbocharger if that turbocharger were protected by an additional warranty.

Note that when step 495 does not identify different sentiments between machine and human outcomes or when such differences are not statistically different, program flow may move from step 495 back to step 410 where additional information may be received from the user devices. This could be based on a different set of conditions or be based on After step 480, step 490, or additional user probes provided after step 495 may also identify that the drivers resistant to the premium price to purchase the larger displacement engine would purchase that larger engine if they were provided a reduced loan interest rate. In such instances information provided by an artificial intelligence system may identify a finding that economic conditions indicate that offering a reduced interest rate is beneficial based on an overall economic incentive. Furthermore, probes may be sent offering such lower interest rate offerings based on the artificial intelligence finding and based on the reluctance associated with the drivers that preferred the larger displacement engine.

Steps consistent with the present disclosure could include fewer steps or more steps than those shown in FIG. 4. Queries, questions, or probes could be sent to user devices after any step. Step 460 may also be performed before step 410, or program flow consistent with the present disclosure may receive machine sentiment information at any time when processes consistent with the present disclosure are performed.

Methods and apparatus consistent with the present disclosure may also compare and contrast user/human preferences/sentiments with machine derived sentiments when forecasting build plans for vehicles. Machine intelligence alone or in synch with expert human intelligence or contrasts in expert human intelligence and machine intelligence may be able to identify an optimal preferred build plan for a family of sport cars. Such methods may use cost factors, statistical uncertainties, and experts of a very particular sort when making adjustments to build plans. Particular experts may include individuals that work in manufacturing, marketing, or sales of a company that produces the family of sport cars. Here again these experts may be tested. Such experts may provide sentiments from a perspective of production or overall efficiency. These sentiments may be used to identify that 35% of the sport cars should be produced with the larger engines, that 33% should be produced with superchargers, and that 32% be produced with turbochargers. Customers purchasing these cars could then be provided with appropriate incentives that were identified using methods consistent with the present disclosure. One of these incentives could include a dealer removing a turbocharger and installing a supercharger at no extra cost, for example.

Steps consistent with the present disclosure may also or alternatively include sentiments regarding appearance of a product. For example, a machine intelligence may identify a preferred a first shape of a grill of a car based on airflow or other factors, where an overall user/human sentiment objects to the grill shape identified by the machine intelligence. This process may then provide quires that identify that the users object to the machine preferred grill because it is ugly or that identify that these users preferred another grill shape. Such determinations could also require that a particular determination be statistically significant.

Embodiments of method and systems consistent with the present disclosure may, therefore, constitute a new hybridized form of intelligence that learns how to organize, prioritize, and make decisions regarding not only members within a given intelligent species, yet between different intelligent species. As such, systems and methods consistent with the present disclosure may make evaluations based on answers provided by one or more preferred members of a species. These decisions may be made to identify preferred members of the human species and/or to identify preferred member(s) of a machine species, for example. These decisions may also cause certain members of the human species to be removed from a set of human members when those certain members as associated with poorly forecasting future events.

The invention may include a context tracking module in an attempt to capture the context sensitive execution (CONSEX) information associated with an artificial intelligence (AI) and that separately captures contextual information associated a particular swarm of human individuals as those individuals make evaluations and choices regarding a common subject. It is expected that both AI 'bots' (automated machines) and the swarm will at times show bias or a disconnect from reality, while the AI will tend to be more fact based yet at times 'off putting' and the human swarm will be prone to emotional, tribal, or have other biases. Information regarding a subject may be sent to members of a human swarm and responses relating to that information may be received from a statistically significant portion of those members. Queries regarding that subject may also be provided to a machine intelligence, after which answers may be received from the machine intelligence. The received information from the members of the human swarm may be compared or contrasted with the answers from the machine intelligence, where contrasting information may be used to identify questions to send to the human swarm members. After statistically significant numbers of responses have been received from the human swarm members, additional questions may be identified and sent to the machine intelligence. Next additional responses may be received from the machine intelligence, after which information associated with the human responses may be compared or contrasted with the additional responses received from the machine intelligence. As such, methods and systems consistent with the present disclosure may be iterative and include a series of steps where information received from human swarm members is compared to responses from a machine intelligence when ways or means of influencing a statistically significant number of the members of that human swarm to make a commitment are identified.

In an example of an iterative process consistent with the present disclosure, a machine intelligence may have been provided parameters regarding the design of a grill of a car. These parameters may include a height, a width, an aspect ratio, and a measure of grill air flow. The machine intelligence may then design a grill that includes a first kind of bars. These bars may have been designed with widths and heights that are consistent with the parameters provided by the machine intelligence. An image of a car including that grill may be provided to a group of persons, after which, information may be received from those persons and that information may identify that a statistically significant portion of that group of persons do not like the appearance of the grill. After identifying that the group of persons did not like the design of the grill, a query may be sent to the machine intelligence causing the machine intelligence to modify the grill design according to information included in that query. The machine intelligence may then design a grill that uses two different types of bars in the grill design, after which an image of a new grill may be provided to the group of persons, and information relating to a sentiment of the group of persons may be identified based on responses from members of that group. In an instance where the sentiment of the group of persons still dislikes the grill, queries may be sent back to the machine intelligence that causes the machine intelligence to change the color of one of the two sets of bars included in the grill. An updated image of the grill may then be provided to the group of persons and responses may be received from members of that group. When that last set of responses from the group members indicates that a statistically significant number of those members likes the updated grill design, that updated grill design may be selected to be included in a production version of the car. As such decisions may be based on iterative sets of information or queries sent to a set of persons associated with a human intelligence and a machine intelligence. Note that contextual information relating to human likes and dislikes may be compared or contrasted with context sensitive execution (CONSEX) information associated with a machine. A human species related swarm of data may include ways and means of capturing human related sentiment data. This human related sentiment data may be biased based on demographic, regional, market segment, or may be related to other types of data types or partitions. Such human related sentiment data may be stored in a database enabled accessibly by a processor executing program codes associated with a powerful statistical software program application/package.

Members of the human species swarm may earn internal human associated credits or tokens (HAT) based on their level of participation and success at making good choices. These credits may be stored in-house in a database or be stored at a third party computing device. In certain instances, particular individuals may earn dividends, interest, credits payments, or other forms of compensation over time. In certain instances such compensation may at any time be converted by a swarm participant into a fungible cryptocurrency. Individuals participating in a human swarm may not have or may never have had a bank account, as such, methods consistent with the present disclosure allow individuals to participate in a virtualized banking system where their crypto-currency earns interest over time.

The method may include a sub-system for tracking confidence limits and classify confidence levels based on one or more types of levels of confidence error or success rates. For example, a Type I and Type II statistical errors made over time may cause a weighting factor assigned to a particular member of a species be reduced over time.

Figure 5:
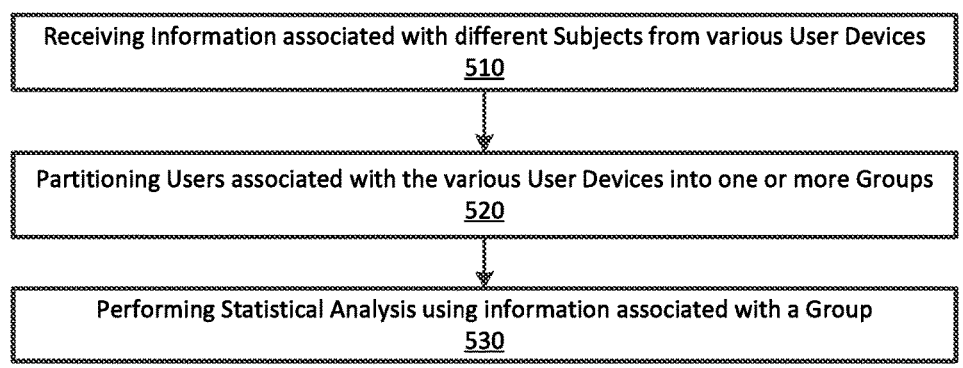
FIG. 5 illustrates a second set of exemplary set of steps that may be performed by server implementing methods consistent with the present disclosure.

FIG. 5 illustrates a second set of exemplary set of steps that may be performed by server implementing methods consistent with the present disclosure. Step 510 of FIG. 5 is a step where information relating to different subjects are received from different user devices. This received information may be used to partition sets of users into different groups in step 520, and a statistical analysis of information associated with particular groups could be used to perform a statistical analysis of a group in step 530 of FIG. 5.

The information received in step 510 may include information related to vehicles, bicycles, camping equipment, computers, cell phones, or other products. The information received from the users may be used to initially separate them into groups, where each different subject may include multiple groups. For example, vehicle groups may include: high end, sporty, performance, luxury, luxury/sedan, truck, or economy. Similarly, users may be partitioned into groups regarding bicycles that they may have preferred sentiment for: mountain, mountain with full suspension, street, cross, theft resistant, or beach.

The statistical analysis of step 530 of FIG. 5 may identify that users preferred lower cost mountain bikes reviewed features or costs associated with full suspension bicycles, yet still appear to prefer the mountain bikes that did not have full suspension. Such identifications may cause methods and systems consistent with the present disclosure to send questions to a user device when identifying why a user associated with that user device was reluctant to purchase a more expensive full suspension bicycle. Questions and answers could be used to change a classification associated with a user. Such questions and answers may be used to identify certain percentages of the users that preferred the lower cost mountain bikes preferred them for different reasons or objections to alternatives, furthermore, such analysis could identify different mitigating factors for each alternative for each user or user type. Such reasons and mitigating factors could include for example: a. Reason: I did not like the rear suspension to be active always; Mitigating Factor: User selectable lock out the rear suspension: b. Reason: Full suspension bikes are too expensive; Mitigating Factor: Discount offer, warranty offer, or both. Such reasons and mitigating factors could be used to identify distributions of user sentiment that could be used to identify market preferences that can improve overall customer satisfaction based on analysis that identifies statistically significant objections/reluctances and by identifying statistically significant offerings/options that increase user satisfaction or participation.

Figure 6:
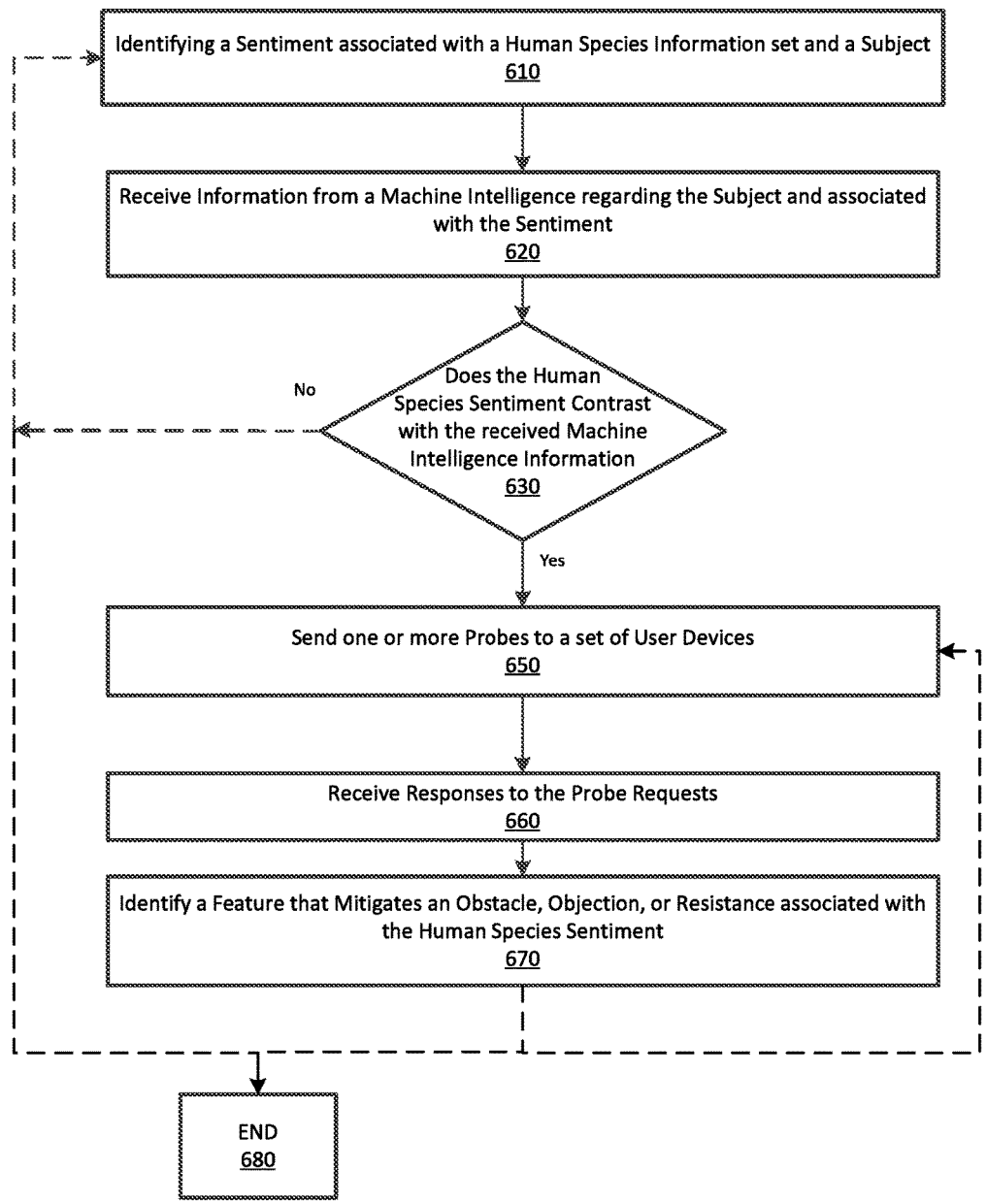
FIG. 6 illustrates a second set of exemplary set of steps that may be performed by server implementing methods consistent with the present disclosure.

FIG. 6 illustrates a second set of exemplary set of steps that may be performed by server implementing methods consistent with the present disclosure. Step 601 of FIG. 6 may identify a sentiment associated with as set of information associated with humans/people and a subject. Here again these sentiments may relate to user preferences identified by actions performed by users of a group of users. Next in step 620 of FIG. 6 information regarding the subject and the sentiment may be received from a machine species. Then determination step 630 may determine whether the human species sentiment contrasts with the machine intelligence sentiment information, when no, program flow may move to step 610 where additional human sentiments may be identified or refined. Note that FIG. 6 indicates that when determination step 630 identifies that human sentiments do not contrast with machine intelligence sentiments, program flow may end at step 680 of FIG. 6.

When the human sentiment is found to contrast with the machine intelligence sentiment information program flow moves from step 630 to step 650, where probes or questions may be sent to user devices that belong to a group. Next in step 660 responses to the requests may be received. Next in step 670, possible mitigating factors associated with an identified or possible objection may be identified, after which program flow may flow back to step 650 where additional probes are sent to the user devices. Alternatively program flow may flow from step 670 to step 610 or end at step 680.

Here again inputs and queries may be used to identify contrasting information when mitigating factors that prevent people of a group from making a commitment.

Figure 7:
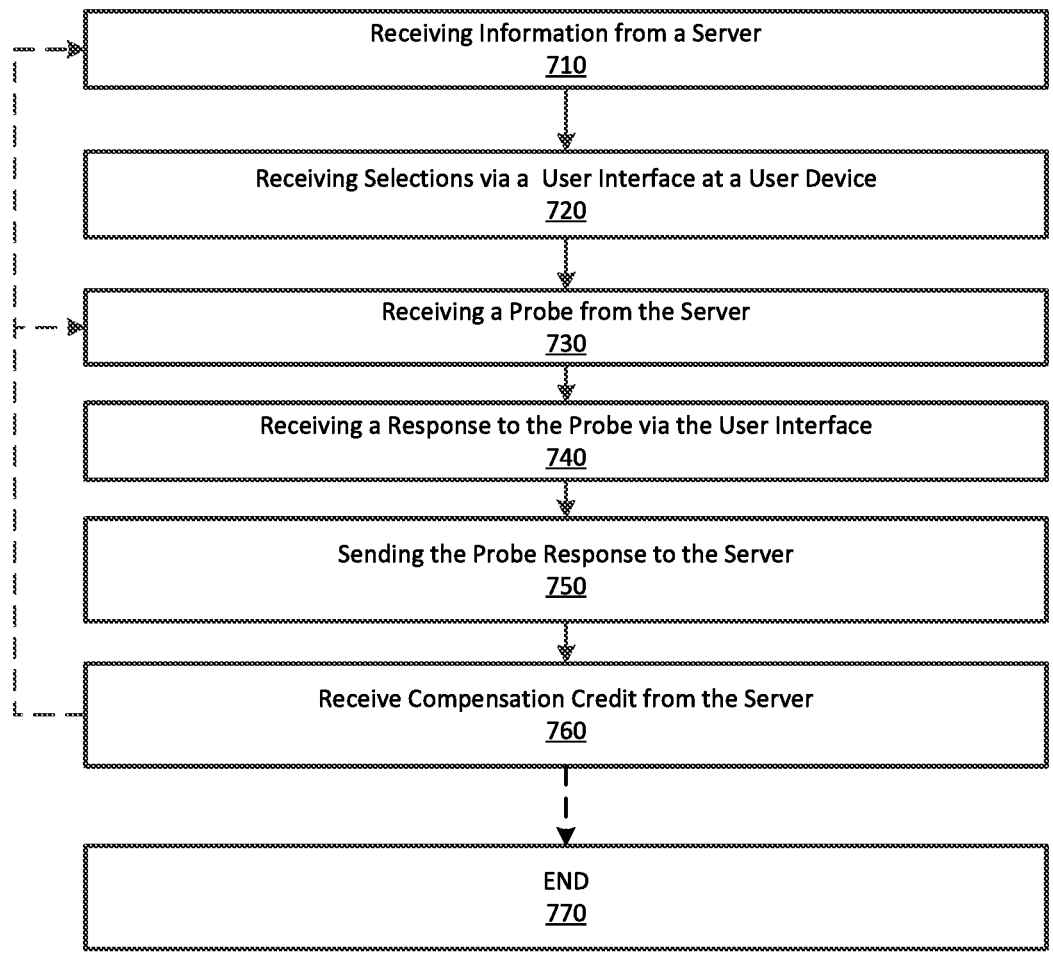
FIG. 7 illustrates an exemplary set of steps that may be performed at a user device.

FIG. 7 illustrates an exemplary set of steps that may be performed at a user device. Step 710 of FIG. 7 is a step where information is received from a server. This information received from the server may be a webpage, maybe a program application, or may include any form of media. Next step 720 may receive selections via a user interface at a user device. These selections may be associated with a type of product or with a subject. Here again these selections could relate to a sport car, where user sentiments relating to style or performance may be identified. Different user groups may be associated with a stylish sport car or with a performance sport car or with both. These selections may be sent to the server and the server may provide content based on the user selections to the user device. For example when a user is associated with a stylish sport car, they may be sent selections that identify different body designs, the look of a fender, a hood, a grill, a roof, doors, interiors, seats, or a tail end for example. After the user makes selections, probes may be received by a user device associated with a user of a user group in step 730. The users of the user group may receive question probes regarding particular design features and what different user of a user group like or do not like about those features of a subject or car. Alternatively or additionally, user devices may receive probes that include interactive media that the user can make additional selections regarding. Probes associated with a lead user may be sent to a group of user devices from a server, when methods consistent with the present disclosure are performed.

After the probe is received, responses to those probes may be received via a user interface or a microphone that a user interacts with in step 740 of FIG. 7. Alternatively or additionally visual responses may be captured by a camera at the user device when program code at a user device identifies possible subjective sentiments of a user based on a visual reaction of a user. Next in step 750 the response or an interpretation of the response may be sent to the server. Since responses may include spoken words, texts, or visual reactions, sentiments associated with a response may interpreted from these words and reactions by software operating at the user device.

After step 750, a user device may receive compensation from the server in the form of a credit or in the by means of a crypto-currency transaction. The received compensation may be based on participation of the user of the user device (where greater participation may yield greater levels of compensation), may be based on identifying an obstacle that could prevent them from making a commitment, or that identifies a factor that mitigates or removes the obstacle. The levels of compensation may be based on a determination that a particular user has provided feedback that proves to be statistically significant over a group of users of a special group of individuals.

For example, a user that first selects a series of style attributes that prove to be well liked by a statistically significant number of their user group, they may be provided enhanced compensation in step 760 of FIG. 4. A user that first identifies an obstacle that proves to be statistically significant may be provided enhanced compensation. Alternatively or additionally a user that provides a mitigating factor or set of mitigating factors that proves to be statistically significant may be provided with enhanced compensation. Individuals that consistently provide statistically significant results may be promoted, and such promotions may enhance their ability to earn compensation. In contrast individuals that do not provide enough statistically significant or important information may be demoted (receive less compensation for a given level of participation or other metric) or be removed from a group. After step 760 program flow may move to step 730 where additional probes may be received, may move to step 710 where additional information may be received from the server, or may move to step 770 where program flow may end.

Since an aspect of the present disclosure includes keeping information associated with different species separate, methods and apparatus consistent with the present disclosure may perform tests that identify whether answers coming from a particular source are really coming from a correct species. For example, in an instance where a hacker provides an AI engine (or bot) to provider answers for them as a member of the human species, the actions of that hacker would tend to corrupt the very purpose of systems consistent with the present disclosure. Because of this, a user device may be sent questions that are more likely to be answered by humans better than machines. In such instances a user device may display a group of photographs, some of which include store fronts and the user may be polled to select which photos of that group include the store front. When a group of correct photos are entered via the user interface and are received by a species evaluation engine, that species evaluation engine can identify that answers received from that user device were really provided by a member of the human species. Such a test is merely exemplary as any test that humans are more likely to answer correctly as compared to a member of a machine species may be used to identify whether a certain entity is really a human or not.

Test relating to identifying whether a particular response provider is truly of the human species may also include tests associated with identifying human emotions, senses, and intuition. An exemplary test may include providing visual or audio information or stimulus to a user device for presentation to a user via a display or a speaker of a user device. Pleasant images or music may be displayed or played to a user after which one or more responses may be provided by or received from the user device. The user interacting with a user interface of the user device may provide indications or responses identifying that the currently displayed images or music is pleasant. Alternatively or additionally unpleasant images or sounds may be displayed or played to a user via the user device and an indication that the displayed or played content may be received from the user device. For example, a blasting siren or other unpleasant sound, if cancelled or shut off within a threshold time could indicate that the user device was being operated by a real human based on their quick action to shut down an unpleasant sound (or image).

In yet other instances, sensors or camera at a user device may be used to view a user or to measure a physiological response from a user as that user is provided pleasant and/or unpleasant images or sounds. Physiological responses, such as movements (backing away, looking away, or paying closer attention), changes in heart rate, changes in perspiration rates, or changes in a respiration rate. As such, user devices associated with the present disclosure may also include cameras or sensors that sense human responses to stimulus provided via a display or speaker.

Figure 8:
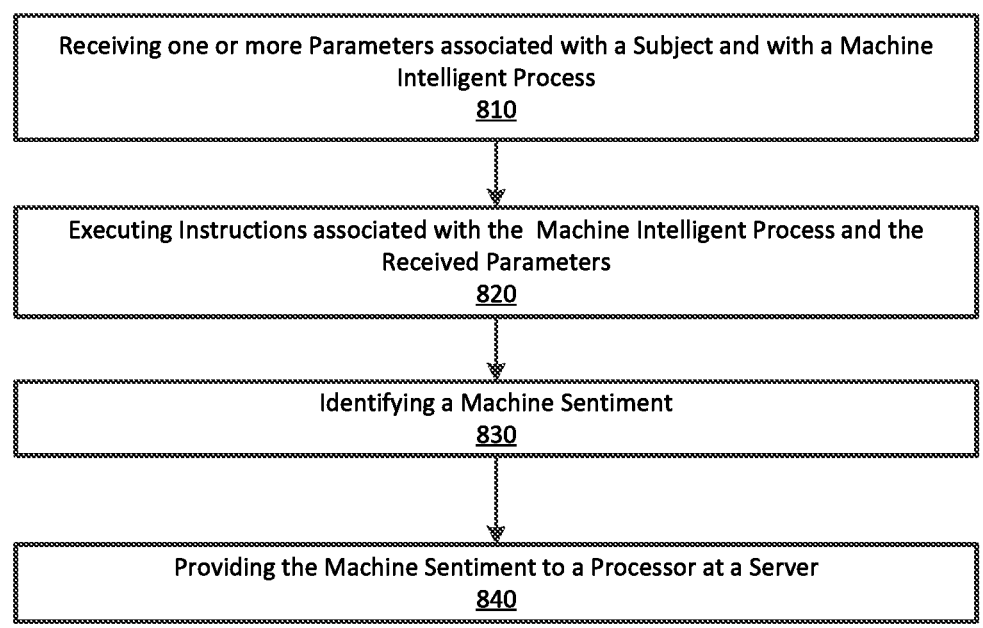
FIG. 8 illustrates an exemplary set of steps that may be performed by a machine intelligent process.

FIG. 8 illustrates an exemplary set of steps that may be performed by a machine intelligent process. FIG. 8 includes step 810, where one or more parameters associated with a subject and an intelligent machine process is provided to the intelligent machine process. The subject may be related to bicycles, for example. The machine process may perform calculations associated with a computer model or other machine construct. This machine process may identify types of bicycles and features or sets of features that may be associated with those bicycles based on the parameters. The parameters may be associated with demographics age, region, assumed user preferences, projected cost/profit, or other metrics. Next in step 820 of FIG. 8 the machine process may by implemented by a processor executing instructions out of a memory using the received parameters, such that a machine sentiment may be generated/identified in step 830. Finally in step 840 of FIG. 8, the machine sentiment may be provided to a processor at a server. In certain instances, the processor performing the steps of the machine process may be included in a sever that communicates with user devices. Alternatively or additionally, the processor performing the machine process may provide the machine sentiment to the processor at the server via a network interface. The method of FIG. 8 may be included within or be coupled to methods and apparatus consistent with the other figures of this disclosure.

Method and apparatus consistent with the present disclosure may be used to improve the accuracy of an intelligent machine process, thereby, improving the operation of computers and computer models. In such instances, information relating to an obstacle or a mitigating factor may be incorporated into the intelligent machine process. The information provided may be in the form of parameters that relate to the obstacle or the mitigating factor may be incorporated into a computer model that forecasts future events or that forecasts human behavior.

In certain instances, differences identified between different streams of information may or may not be statistically significant. An AI stream could indicate that a stock should be sold and a human stream could indicate that the stock should be purchased, yet the human stream could include attributes that associate the stock with a weak buy position. As such, buy or sell indications of a give species may be associated with metrics of weakness or strength. For example, when 510 of 1000 of user responses indicate that a certain stock should be purchased, the stock may be associated with a weak buy. In such an instance, when an AI stream indicates this same stock should be sold, the difference between the two streams may be considered not statistically significant. In such instances a strong buy or sell indication may be associated with a threshold ratio of buy versus sell responses, a threshold percentage of buy versus sell responses, or a strong indication may be identified by performing a statistical analysis or historical analysis. Alternatively, threshold ratios or percentages or statistical/historical analysis may be used to identify strong sell indications, weak sell indications, or weak buy indications of a stream. Statistically significant differences may be associated with data sets that are large enough to represent populations of information that provide an indication that is greater than a threshold level that may be associated with ratios, percentages, chances, probabilities, error rates, or a significance level. The statistical significance of a set of human responses or a preferred human response may be associated with a certainty level. For example, a certainty level associated with human query responses or with a preferred human query response that is related to a number of human responders, users, with weights associated with favored human responders, or with a sample size that is greater than a margin of error. A preferred human response may be considered statistically significant when a preferred human query response is at or above a statistical threshold.

Biases of particular individuals or streams of information (machine/AI stream or a human stream) may also be identified. Biases may be associated with an offset, for example in an instance where a stream or an individual provides responses that are associated with a magnitude, if that magnitude is within a threshold distance of an absolute correct answer magnitude, then such responses may be identified as being correct, just offset from particular correct response. Such a user or stream may then be judged as correct, yet biased. Such a bias could be identified and used when making buy or sell decisions according to methods consistent with the present disclosure.

Methods and apparatus of the present disclosure may also include information relating to real-world contextual information or information associated with the physical world. For example, a human stream may provide information regarding the weather where users are located. Indications can be received from user devices as part of a regional stream associated with a locality (city, state, or other location). These indications could identify that the weather is getting better or worse. That a tornado is approaching or moving away from my neighborhood, that rain is increasing or decreasing, that a river is rising or lowering, that flood waters are getting higher or are abating, that winds are increasing or decreasing, or that fire is moving in a certain direction. This human stream may be contrasted with a weather prediction stream that predicts the course of a storm and could be used to issue alerts to areas identified with risk to life or property with greater certainty. Machine intelligence may benefit from information sensed by sensing stations, by Doppler radar, or by infrared or other instrumentation, for example, when assessing whether and where risk reports or evacuation orders should be issued. Alternatively, a human stream may be associated volatility of a region of the world based at least in part on observations made by individuals in a particular locality. Sensor data that senses loud noises, smoke, or other disruptions may be use by a machine intelligence when identifying weather an area should be associated with a risk. As such, real world information provided by users can be contrasted with information from AI systems when validating that a risk is real, where a sophisticated enough AI system may be able to identify the location of a particular risk based on sensor data.

As much as humans and intelligent machines are different species, different members of the animal kingdom are also different species from either humans or intelligence species that are each alien from each other. The universe at large may also include beings that are forms of intelligent species that are alien to humans, animals, or intelligent machines.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for identifying factors that mitigate objections in a demographic group, the method comprising:
   receiving selections from a plurality of user devices operated by users that are associated with a first user group, the received selections associated with a subject;
   receiving information from an intelligent machine process that includes a machine sentiment associated with the subject;
   identifying one or more user sentiments associated with the selections received from the plurality of user devices;
   identifying that the machine sentiment contrasts with the one or more identified user sentiments;
   performing a statistical analysis on the one or more identified user sentiments;
   sending one or more probes to the plurality of user devices, the one or more probes associated with identifying an obstacle that could prevent a statistically significant number of users from the first user group from committing to an offering associated with the subject;
   receiving responses to the one or more probes sent to the plurality of user devices;
   evaluating the received probe responses;
   identifying a mitigating factor based on the evaluation of the received probe responses, the mitigating factor associated with overcoming the obstacle that could prevent the statistically significant number of users from the first user group from committing to the offering;
   identifying a parameter of the intelligent machine process that is related to the mitigating factor; and
   sending a query to the machine process that results in the machine process parameter being updated based on the identification that the parameter is related to the mitigating factor.

2. The method of claim 1, further comprising identifying one or other more parameters to associate with the intelligent machine process, wherein:
   the selections received from the plurality of user devices and the information received from the intelligent machine process are associated with a first iteration of interactions with the users of the first user group and with the intelligent machine process;
   the one or more other parameters are related to at least one of the obstacle or the mitigating factor;
   the one or more other parameters are incorporated into the intelligent machine process to improve the accuracy of the intelligent machine process as part of a second iteration of interactions with the users of the first user group and with the intelligent machine process; and
   subsequent executions of the intelligent machine process are performed in accordance to the one or more other parameters related to the at least one of the obstacle or the mitigating factor.

3. The method of claim 1, wherein the evaluation of the received probe responses includes:
   identifying that the probe responses include responses that indicate that at least some of the users from the first user group would not commit to the offering;

performing a statistical analysis to identify whether at least one of the non-committal probe responses is statistically significant;
sending additional probes to user devices associated with the non-committal probe responses, and
receiving responses to the additional probes sent to the associated user devices, wherein the mitigating factor is identified from information associated with the additional probes sent to the associated user devices.

4. The method of claim 1, further comprising:
identifying a level of participation associated with each of the users from the first user group;
calculating a compensation to provide to a first user from the first user group; and
providing the compensation to a user device associated with the first user.

5. The method of claim 1, further comprising:
identifying one or more users that identified the obstacle within a first time period;
sending additional probe requests to one or more of the plurality of user devices operated by the users from the first user group;
receiving responses to the additional probe requests;
performing a second statistical analysis after receiving the additional probe request responses;
identifying from the second statistical analysis that the obstacle is statistically significant; and
allocating a compensation to the one or more users based on the one or more users identifying the obstacle within the first time period and based on the identification that the obstacle is statistically significant, wherein the one or more users are provided the compensation based on the compensation allocation.

6. The method of claim 1, further comprising:
identifying one or more users that were persuaded to commit to the offering over a first time period, the commitment based on the offering being modified to include the mitigating factor;
sending additional probe requests to one or more of the plurality of user devices operated by the users from the first user group;
receiving responses to the additional probe requests;
performing a second statistical analysis after receiving the additional probe request responses;
identifying from the second statistical analysis that the mitigating factor is statistically significant; and
allocating a compensation to the one or more users based on the one or more users committing to the mitigating factor within the first time period and based on the identification that the mitigating factor is statistically significant, wherein the one or more users are provided the compensation based on the compensation allocation.

7. The method of claim 1, further comprising:
calculating compensation amounts to provide to one or more users from the first user group, the calculation associated with at least one of an amount of participation associated with the one or more users, one or more sentiments received from user devices associated with the one or more users that prove to be statistically significant, or one or more responses received from the one or more user devices that prove to be statistically significant; and
providing the compensation to each of the one or more user devices in accordance with the calculated compensation amounts.

8. The method of claim 1, wherein the subject relates to at least one of a product or service.

9. The method of claim 1, further comprising:
identifying a user from the first user group that is associated with a performance level that is above a threshold level of performance; and
increasing a compensation rate associated with the user based on the identification that the user from the first user group performed at a level that is above the threshold level of performance.

10. The method of claim 1, further comprising:
receiving updated information from the intelligent machine process that includes an updated machine sentiment associated with the subject, the updated information received based on execution of the intelligent machine process with the updated machine process parameter; and
identifying that the updated machine sentiment does not contrast with one or more updated user sentiments.

11. A non-transitory computer-readable storage medium having embodied thereon a program executable by a processor for implementing a method for identifying factors that mitigate objections in a demographic group, the method comprising:
receiving selections from a plurality of user devices operated by users that are associated with a first user group, the received selections associated with a subject;
receiving information from an intelligent machine process that includes a machine sentiment associated with the subject;
identifying one or more user sentiments associated with the selections received from the plurality of user devices;
identifying that the machine sentiment contrasts with the one or more identified user sentiments;
performing a statistical analysis on the one or more identified user sentiments;
sending one or more probes to the plurality of user devices, the one or more probes associated with identifying an obstacle that could prevent a statistically significant number of users from the first user group from committing to an offering associated with the subject;
receiving responses to the one or more probes sent to the plurality of user devices;
evaluating the received probe responses;
identifying a mitigating factor based on the evaluation of the received probe responses, the mitigating factor associated with overcoming the obstacle that could prevent the statistically significant number of users from the first user group from committing to the offering; and
identifying a parameter of the intelligent machine process that is related to the mitigating factor; and
sending a query to the machine process that results in the machine process parameter being updated based on the identification that the parameter is related to the mitigating factor.

12. The non-transitory computer-readable storage medium of claim 1, the program further executable to identify one or more other parameters to associate with the intelligent machine process, wherein:
the selections received from the plurality of user devices and the information received from the intelligent machine process are associated with a first iteration of interactions with the users of the first user group and with the intelligent machine process;

the one or more other parameters are related to at least one of the obstacle or the mitigating factor;

the one or more other parameters are incorporated into the intelligent machine process to improve the accuracy of the intelligent machine process as part of a second iteration of interactions with the users of the first user group and with the intelligent machine process; and subsequent executions of the intelligent machine process are performed in accordance to the one or more other parameters related to the at least one of the obstacle or the mitigating factor.

13. The non-transitory computer-readable storage medium of claim 10, wherein the evaluation of the received probe responses includes:

identifying that the probe responses include responses that indicate that at least some of the users from the first user group would not commit to the offering;

performing a statistical analysis to identify whether at least one of the non-committal probe responses is statistically significant;

sending additional probes to user devices associated with the non-committal probe responses, and receiving responses to the additional probes sent to the associated user devices, wherein the mitigating factor is identified from information associated with the additional probes sent to the associated user devices.

14. The non-transitory computer-readable storage medium of claim 11, the program further executable to:

identify a level of participation associated with each of the users from the first user group;

calculate a compensation to provide to a first user from the first user group; and provide the compensation to a user device associated with the first user.

15. The non-transitory computer-readable storage medium of claim 11, the program further executable to identify one or more users that identified the obstacle within a first time period;

send additional probe requests to one or more of the plurality of user devices operated by the users from the first user group;

receive responses to the additional probe requests;

perform a second statistical analysis after receiving the additional probe request responses;

identify from the second statistical analysis that the obstacle is statistically significant; and allocate a compensation to the one or more users based on the one or more users identifying the obstacle within the first time period and based on the identification that the obstacle is statistically significant, wherein the one or more users are provided the compensation based on the compensation allocation.

16. The non-transitory computer-readable storage medium of claim 11, the program further executable to:

identify one or more users that were persuaded to commit to the offering over a first time period, the commitment based on the offering being modified to include the mitigating factor;

send additional probe requests to one or more of the plurality of user devices operated by the users from the first user group;

receive responses to the additional probe requests;

performing a second statistical analysis after receiving the additional probe request responses;

identify from the second statistical analysis that the mitigating factor is statistically significant; and allocate a compensation to the one or more users based on the one or more users committing to the mitigating factor within the first time period and based on the identification that the mitigating factor is statistically significant, wherein the one or more users are provided the compensation based on the compensation allocation.

17. The non-transitory computer-readable storage medium of claim 11, the program further executable to:

calculate compensation amounts to provide to one or more users from the first user group, the calculation associated with at least one of an amount of participation associated with the one or more users, one or more sentiments received from user devices associated with the one or more users that prove to be statistically significant, or one or more responses received from the one or more user devices that prove to be statistically significant; and provide the compensation to each of the one or more user devices in accordance with the calculated compensation amounts.

18. The non-transitory computer-readable storage medium of claim 11, wherein the subject relates to at least one of a product or service.

19. The non-transitory computer-readable storage medium of claim 11, the program further executable to:

identify a user from the first user group that is associated with a performance level that is above a threshold level of performance; and increase a compensation rate associated with the user based on the identification that the user from the first user group performed at a level that is above the threshold level of performance.

20. An apparatus that identifies factors that mitigate objections in a demographic group, the apparatus comprising:

a interface that receives selections from a plurality of user devices operated by users that are associated with a first user group, the received selections associated with a subject;

a memory; and a processor that executes instructions out of the memory to:

receive information from an intelligent machine process that includes a machine sentiment associated with the subject, identify one or more user sentiments associated with the selections received from the plurality of user devices, identify that the machine sentiment contrasts with the one or more identified user sentiments, perform a statistical analysis on the one or more identified user sentiments, wherein the interface:

sends one or more probes to the plurality of user devices, the one or more probes associated with identifying an obstacle that could prevent a statistically significant number of users from the first user group from committing to an offering associated with the subject, and receives responses to the one or more probes sent to the plurality of user devices, evaluate the received probe responses to identify a mitigating factor based on the evaluation of the received probe responses, the mitigating factor associated with overcoming the obstacle that could prevent the statistically significant number of users from the first user group from committing to the offering, and identify a parameter of the intelligent machine process that is related to the mitigating factor, wherein the interface also sends a query to the machine process that results in the machine process parameter being updated based on the identification that the parameter is related to the mitigating factor.

21. The apparatus of claim 20, wherein:

the selections received from the plurality of user devices and the information received from the intelligent machine process are associated with a first iteration of interactions with the users of the first user group and with the intelligent machine process, one or more other parameters to associate with the intelligent machine process are identified, the one or more other parameters are related to at least one of the obstacle or the mitigating factor, the one or more other parameters are incorporated into the intelligent machine process to improve the accuracy of the intelligent machine process as part of a second iteration of interactions with the users of the first user group and with the intelligent machine process, and subsequent executions of the intelligent machine process are performed in accordance to the one or more parameters related to the at least one of the obstacle or the mitigating factor.

\* \* \* \* \*